(12) United States Patent
Tonshal et al.

(10) Patent No.: US 10,318,247 B2
(45) Date of Patent: Jun. 11, 2019

(54) SCRIPTING ON A TELEMATICS CONTROL UNIT

(71) Applicant: Ford Global Technologies, LLC, Dearborn, MI (US)

(72) Inventors: Basavaraj Tonshal, Northville, MI (US); Jamal Alezzani, Dearborn, MI (US); John William Schmotzer, Canton, MI (US); Panduranga Chary Kondoju, Westland, MI (US); Harminder Sandhu, Farmington Hills, MI (US); Mark Meyer, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 15/074,602

(22) Filed: Mar. 18, 2016

(65) Prior Publication Data

US 2017/0269908 A1    Sep. 21, 2017

(51) Int. Cl.
*G06F 8/30* (2018.01)
*G06F 8/65* (2018.01)
*G06F 9/54* (2006.01)
*G06F 9/455* (2018.01)

(52) U.S. Cl.
CPC ............. *G06F 8/30* (2013.01); *G06F 8/65* (2013.01); *G06F 9/45508* (2013.01); *G06F 9/45516* (2013.01); *G06F 9/45558* (2013.01); *G06F 9/54* (2013.01); *G06F 2009/45562* (2013.01)

(58) Field of Classification Search
CPC ......... G06F 2009/4557; G06F 11/1484; G06F 2009/45562; B60R 16/023; H04L 67/12; H04L 2209/84
See application file for complete search history.

(56) References Cited

U.S. PATENT DOCUMENTS

| 7,506,309 | B2 | 3/2009 | Schaefer | |
| 7,599,843 | B2* | 10/2009 | Watkins | G06Q 10/08 |
| | | | | 705/1.1 |
| 8,397,228 | B2 | 3/2013 | Matlin et al. | |
| 8,504,837 | B2* | 8/2013 | Jasper | H04L 63/0853 |
| | | | | 713/172 |

(Continued)

FOREIGN PATENT DOCUMENTS

GB          2388666 A       11/2003

OTHER PUBLICATIONS

Dhivyasri G et al.; Advanced Fuel Level Tracking System Using Telematic Unit; IEEE; 6 pages; <https://ieeexplore.ieee.org/stamp/stamp.jsp?tp=&arnumber=7226119>; retrieved on Dec. 27, 2018 (Year: 2015).*

(Continued)

*Primary Examiner* — Geoffrey R St Leger
*Assistant Examiner* — Cuong V Luu
(74) *Attorney, Agent, or Firm* — Frank Lollo; Neal, Gerber & Eisenberg LLP; James P. Muraff

(57) ABSTRACT

A telematics control system includes: an external server configured to serialize a script with an external protocol buffer and transmit the serialized script to a telematics control units (TCU); a vehicle having sensors and the TCU, the TCU configured to: deserialize the script with a TCU protocol buffer, execute the script via an interpreter preloaded on the TCU, store data from the sensors based on the script.

13 Claims, 6 Drawing Sheets

(56) References Cited

U.S. PATENT DOCUMENTS

| | | | | |
|---|---|---|---|---|
| 8,639,234 B2* | 1/2014 | Sumcad | ............... | H04L 63/126 455/412.2 |
| 9,830,141 B2* | 11/2017 | Cairns | ...................... | G06F 8/65 |
| 2004/0176905 A1* | 9/2004 | Sanqunetti | ............ | G01C 21/26 701/532 |
| 2005/0075892 A1* | 4/2005 | Watkins | ................ | G06Q 10/08 705/1.1 |
| 2005/0187680 A1* | 8/2005 | Kamdar | ................ | G07C 5/008 701/31.4 |
| 2005/0216902 A1 | 9/2005 | Schaefer | | |
| 2007/0046821 A1 | 3/2007 | Mead et al. | | |
| 2007/0055414 A1 | 3/2007 | Darji | | |
| 2009/0100420 A1* | 4/2009 | Sapuntzakis | .............. | G06F 8/65 717/171 |
| 2009/0247132 A1* | 10/2009 | Sumcad | ............... | H04L 63/126 455/412.1 |
| 2009/0287499 A1 | 11/2009 | Link, II | | |
| 2011/0083128 A1 | 4/2011 | Hoch et al. | | |
| 2012/0096272 A1* | 4/2012 | Jasper | ................ | H04L 63/0853 713/176 |
| 2013/0174117 A1* | 7/2013 | Watters | .............. | G06F 11/3664 717/106 |
| 2013/0304281 A1 | 11/2013 | Burcham et al. | | |
| 2014/0100737 A1 | 4/2014 | Haap et al. | | |
| 2015/0074659 A1* | 3/2015 | Madsen | .................... | G06F 8/61 717/177 |
| 2015/0178064 A1* | 6/2015 | Cairns | ....................... | G06F 8/65 717/171 |
| 2016/0117868 A1* | 4/2016 | Mitchell | .............. | B60R 16/023 701/32.3 |
| 2016/0139949 A1* | 5/2016 | Jagannath | ............. | G06F 9/5022 718/1 |

OTHER PUBLICATIONS

Gokila Deepa G et al.; Designed Automotive Telematic Unit for Incessant Fuel Analysis; IJCSMC; pp. 126-135; <https://pdfs.semanticscholar.org/5446/a344edbff9e030eb09ae457f05c610391914.pdf>; retrieved on Dec. 27, 2018 (Year: 2015).*

Roberto Ierusalimschy et al., Lua 5.3 Reference Manual [online], Lua.org, 2015, 99 pages, retrieved Feb. 25, 2016 from http://www.lua.org/manual/5.3/manual.html#2.6.

Developer Guide [online], Google.com, Last updated Jan. 20, 2016, 6 pages, retrieved Feb. 25, 2016 from https://developers.google.com/protocol-buffers/docs/overview.

Search Report dated Aug. 31, 2017 for GB Patent Application No. 1704152.6 (5 pages).

* cited by examiner

SCRIPTING ON A TELEMATICS CONTROL UNIT

TECHNICAL FIELD

This disclosure relates to running scripts on a vehicle telematics control unit.

BACKGROUND

Vehicle telematics control units (TCUs) extract data generated in a vehicle, prepare the extracted data for transmission, and then transmit the data over an antenna. Traditional TCUs perform these operations according to instructions generated according to pre-compiled code. Pre-compiled code is difficult to dynamically update and therefore TCU manufacturers must pre-load (i.e., hard code) the full set of TCU software at the time of manufacturing. The term "hard code," as used in the art, means embedding the code in the program's source code such that revising the embedded code requires the user to supply new source code. This methodology results in a lossy system that gathers data in a way unsuitable for finding ms resolution of quickly changing vehicle parameters.

SUMMARY

This disclosure remedies the above problems by providing methods and systems of dynamically updating code running on a vehicle telematics control unit (TCU). In some embodiments, the disclosure provides a telematics control system including: an external server configured to serialize a script with an external protocol buffer and transmit the serialized script to a TCU; a vehicle having sensors and the TCU, the TCU configured to: deserialize the script with a TCU protocol buffer, execute the script via an interpreter preloaded on the TCU, store data from the sensors based on the script.

This disclosure also provides a method of controlling a telematics control unit (TCU) in a vehicle including sensors, the TCU including an antenna, a processor, and memory, the method including: serializing a script with an external server protocol buffer, transmitting the serialized script to the TCU, deserializing the script with a TCU protocol buffer, executing the script via an interpreter preloaded on the TCU, storing data from vehicle sensors based on the script.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
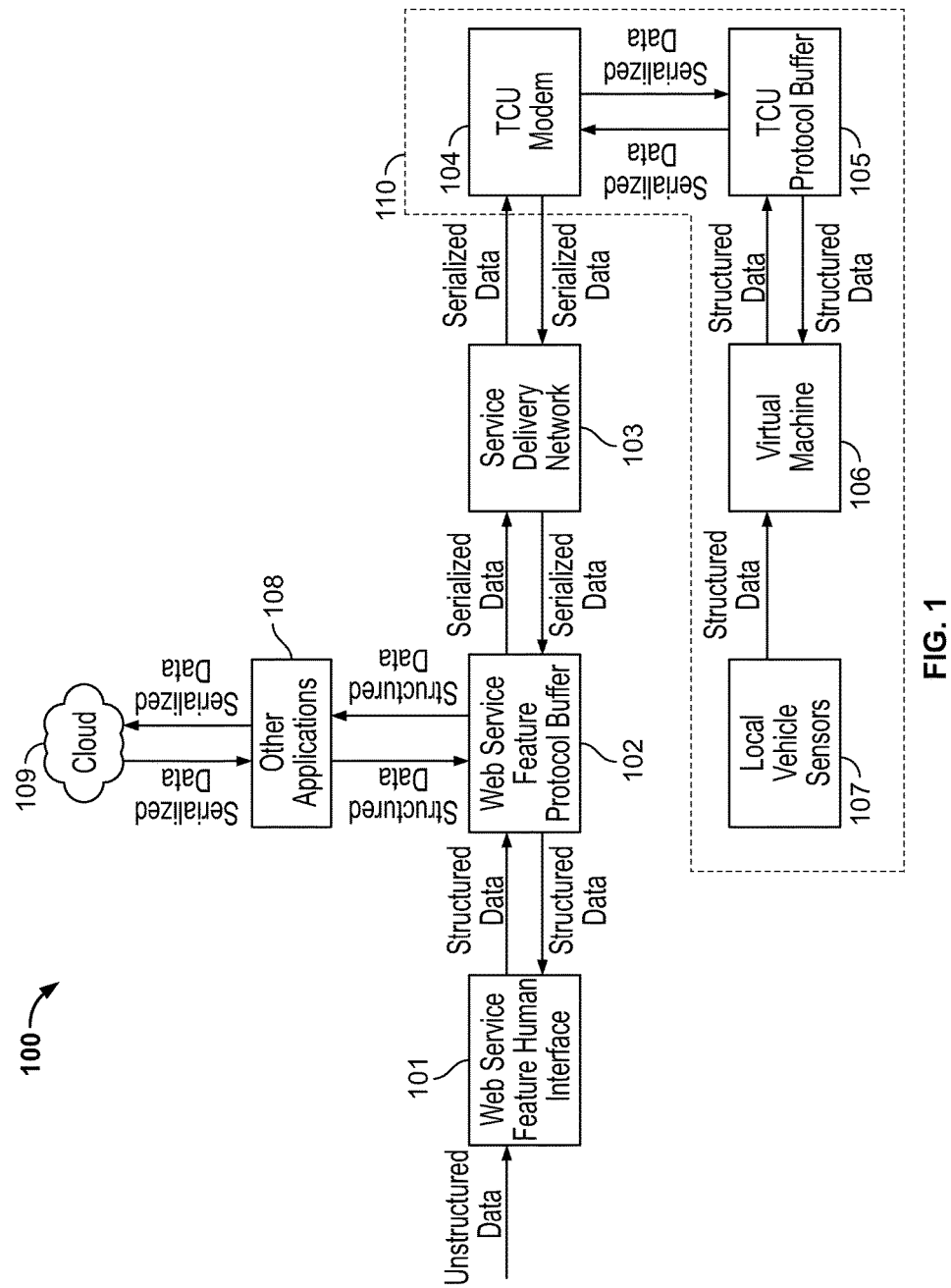
FIG. 1 is a block diagram of data transmission to and from a vehicle

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

Figure 5:
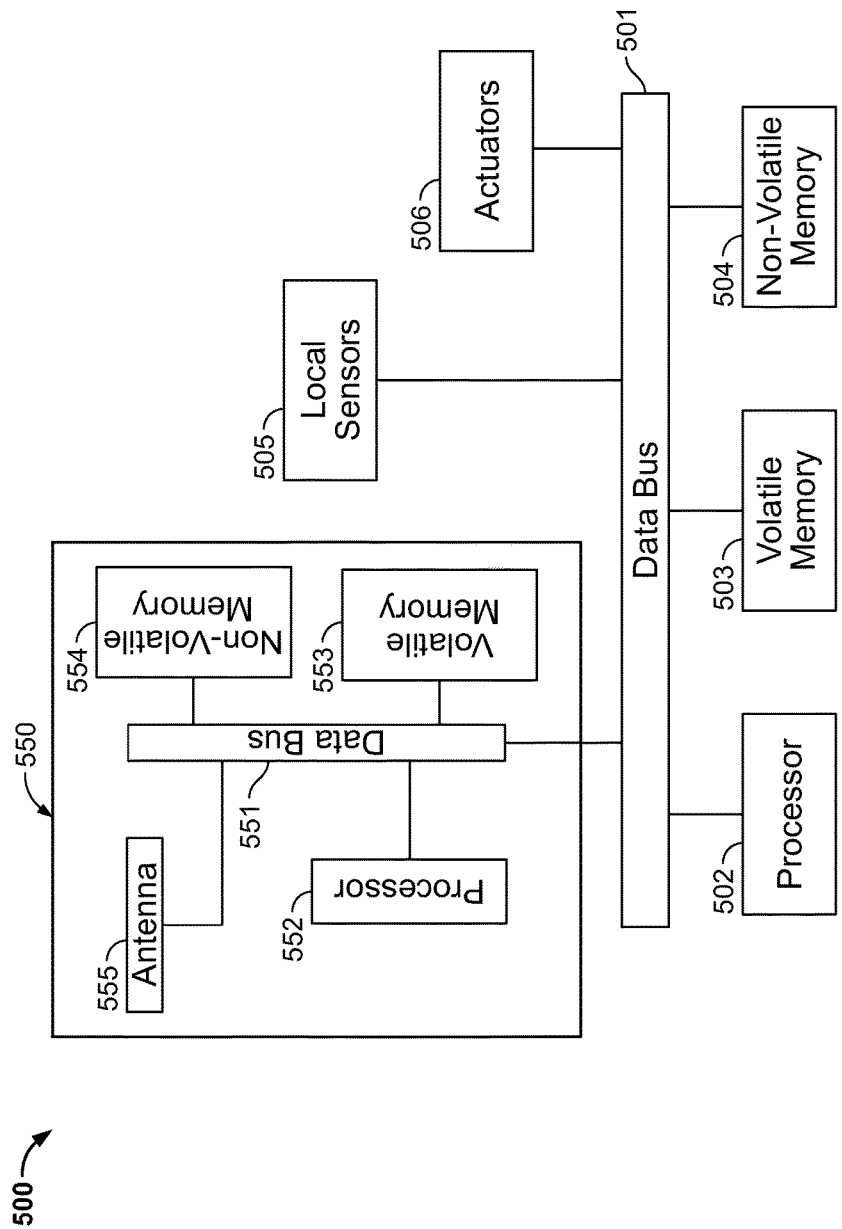
FIG. 5 is a block diagram of a vehicle hardware.

With reference to FIG. 5, hardware components 500 of a vehicle 110 are generally shown and illustrated. The vehicle 110 may be a passenger vehicle having an engine or motor, a battery, a steering wheel, windows, doors, seatbelts, tires, etc. The vehicle 110 may be a sedan, an SUV, a motorcycle, or a truck. The vehicle may be gasoline powered, diesel powered, natural gas powered, hybrid, or electric.

The vehicle 110 has a main data bus 501, which operatively links one or more processors 503, volatile memory 503 such as random-access-memory, non-volatile memory 504 such as a magnetic hard drive or a solid state device, actuators 506 that control the movement of electro-mechanical vehicle components such as the transmission or fuel injectors, and local sensors 505 that are configured to measure dimensions of events occurring in or around the vehicle. Examples of local sensors 505 include engine temperature sensors, ambient temperature sensors, passenger compartment temperature sensors, engine RPM sensors, battery temperature sensors, battery charge level sensors, velocity sensors, etc. The sensors may be digital or analog.

The vehicle 110 wirelessly communicates via a telematics control unit (TCU) 550, which functions as a modem for the vehicle. As shown in FIG. 5, the TCU 550 may be operatively connected to the main data bus 501. The TCU is a self-contained processing package with a TCU databus 551 operatively linked to TCU processors 552, TCU volatile memory 553, TCU non-volatile memory 554, and antennas 555. The TCU memory may include a plurality of hard-coded telematics protocols. The hardware configuration of a TCU is known in the art and disclosed, for example, in US Publication No. 2007/0055414, which is hereby incorporated by reference in its entirety.

During normal operation, various local sensors 505 measure conditions in or around the vehicle. The local sensors output a stream of serialized data to the vehicle data bus 501 that (a) identifies the sensor and (b) includes a measurement or dimension. Suitable local vehicle sensors are known in the art and presently exist on consumer vehicles.

Returning to the TCU, the one or more TCU antennas 555 may be configured to generate and receive wireless signals enabling wireless connection via one or more service delivery networks. The networks may be consumer cellular networks such as those owned and operated by common cellular carriers including AT&T, Verizon, T-Mobile, etc.

The networks may be proprietary wireless networks or inter-vehicle networks. Suitable antennas are commercially available and are known in the art.

The TCU 550 includes telematics protocols stored on the TCU memory for execution on the TCU processor. The telematics protocols are configured to receive data marked for transmission to an outside source, then convert the data into a series of bits suitable for transmission as signals or waves over the one or more antennas 555. As noted above, the telematics protocols may be hard coded onto the TCU memory.

Turning now to FIG. 1, a method of dynamically updating software running or stored on the TCU 550 is generally shown and illustrated. A person enters data into a web service feature human interface 101. The web service feature human interface 101 is displayed in response to a person accessing a computer program such as a website. The person enters the data, such as lines of scripting code, into the web service feature human interface in unstructured form. Unstructured data is typically human-readable raw information. For example, the text of this patent application is unstructured data. Structured data, in contrast, is organized according to some logical rules. Structured data is typically machine readable.

Returning to FIG. 1, the web service feature human interface 101 converts the unstructured data into structured or machine readable data. For example, a person may enter a line of code intended for execution on the vehicle. The human interface 101 then structures this data so that it follows the set of logical rules that can be read and implemented by other software.

The web service feature protocol buffer 102 receives the structured data and converts it into serialized data. Serialized data can be embodied in bit format, which enables the serialized data to be stored on a computer or transmitted between computers as a series of physical electrical (or magnetic) signals or impulses. In one embodiment of the present invention, the protocol buffer 102 is a Google Protocol Buffer (GPB). In various embodiments, the protocol buffer 102 operates as an API for the TCU 550. More specifically, the protocol buffer 102 is configured to transmit serialized data to the TCU, such as lines of code, for execution on the TCU. The protocol buffer 102 is also configured to de-serialize data sent from the TCU into a user-specified data structure. Additional features of the GPB are described in the GPB Developer Guide, available at developers.google.com/protocol-buffers/docs/techniques, which is hereby incorporated by reference in its entirety.

With reference to FIG. 1, the protocol buffer 102 may transmit the structured data to other applications 108 running on the same server as the protocol buffer. The other applications 108 may serialize the data for transmission to external servers hosting a data cloud 109.

After serializing the structured data, the protocol buffer 102 transmits the serialized data to a vehicle 110, and specifically to the TCU 550, over a service delivery network 103. Service delivery networks include consumer cellular networks such as those owned and operated by common cellular carriers including AT&T, Verizon, T-Mobile, etc.

The vehicle 110 receives the serialized data as electrical signals or impulses via the TCU modem 104, which includes the TCU antenna 555 and programs stored on the TCU memory and executed on the TCU processor 552. The TCU modem decodes the physical signals or impulses received at the antenna into machine-readable serialized data. In various embodiments, the TCU antenna 555 includes a dedicated processor and memory.

The machine-readable bit format is a copy of the serialized data transmitted from the web service feature protocol buffer 102 over the service delivery network 103. To interact with the data, the TCU de-serializes the series of bits into structured data via a protocol buffer stored on the TCU memory 553 and 554 and executed on the TCU processor 552. The TCU protocol buffer may include the same serializing program or software as the web service feature protocol buffer 102. By de-serializing the data, the TCU Protocol Buffer 105 replicates the structured data originally serialized at the web service feature protocol buffer 102.

The TCU builds a virtual machine with the de-serialized data received from the TCU modem 104. More specifically, the de-serialized data includes a script for execution on the TCU. Software pre-loaded on the TCU memory, as explained below, is configured to run the script on the TCU processor thus creating the virtual machine.

Figure 6:
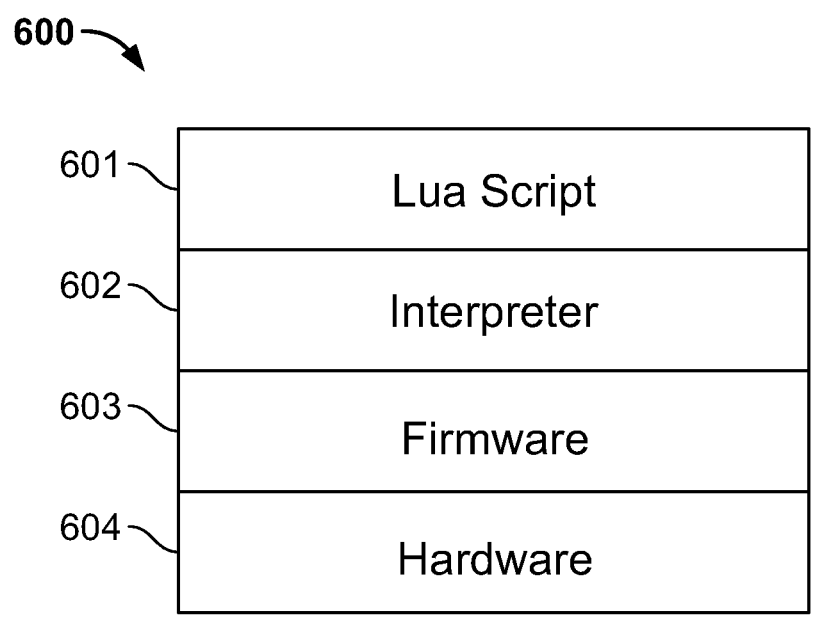
FIG. 6 is a block diagram of script interfacing with vehicle hardware.

FIG. 6 illustrates a block diagram how the script interacts with the hardware and software pre-loaded on the vehicle. More specifically, the vehicle includes hardware 604, such as the TCU hardware illustrated in FIG. 5. TCU firmware 603 (or a TCU operating system) is preloaded onto the vehicle and is configured to interface with the TCU hardware 604. An interpreter 602 is also preloaded onto the TCU and is configured to translate the Lua Script into instructions readable by the firmware 603. The interaction of a Lua Script with firmware is generally known in the art and is described, for example, in US Publication No. 2007/0046821, which is hereby incorporated by reference in its entirety.

Figure 2:
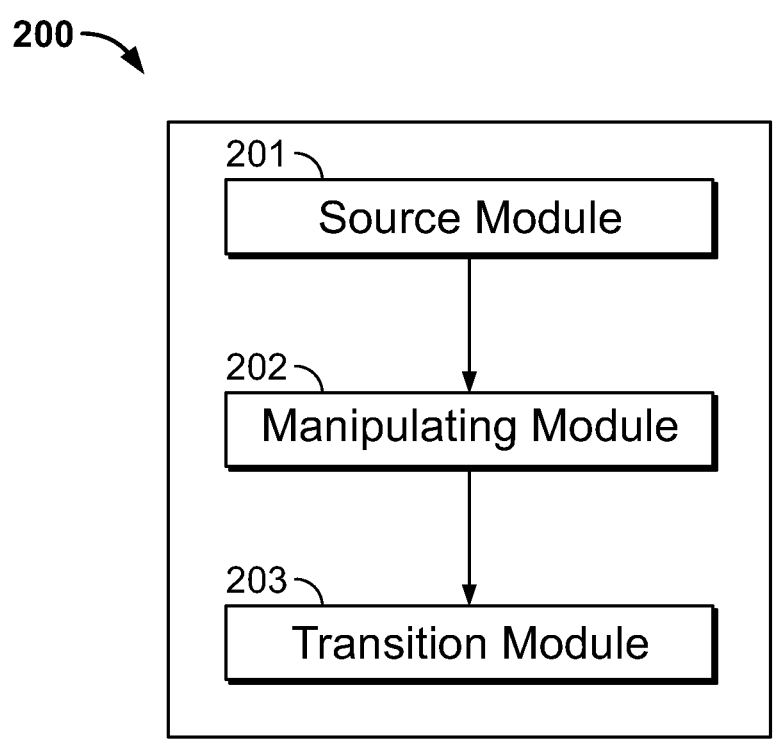
FIG. 2 is a block diagram of modules contained within scripting code

FIG. 2 generally illustrates various operations of lines of code of the script 601, such as the Lua script. Each line of code 200 may include one or more of a source module 201, a manipulating module 202, and a transition module 203. The source module 201 identifies one or more specific sensors and the structure of the sensors' data. The manipulating module 203 includes math operations that the TCU hardware performs on the input from the specific sensors. The transition module 204 identifies how the script responds to outputs of the manipulating module 203.

Figure 3:
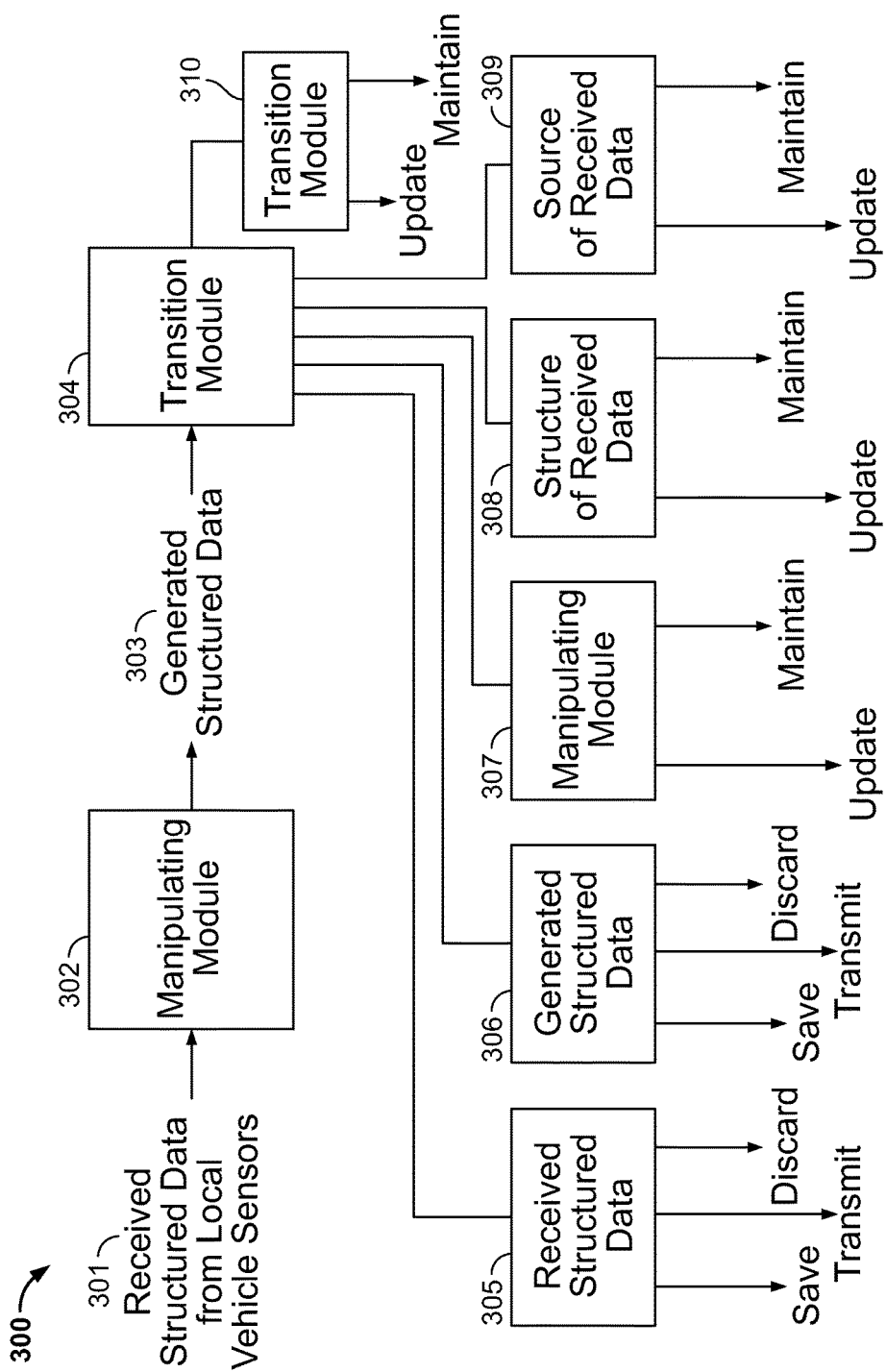
FIG. 3 is a block diagram of a virtual machine executing with the script

FIG. 3 is a block diagram of a virtual machine 300 generated with the lines of code 200. At 301, the virtual machine receives data from specific sensors (according to the source module 201) in a specific format or structure. At 302, the virtual machine performs operations on the received data according to instructions in the manipulating module 202. At 303, the virtual machine outputs new structured data. At 304, the virtual machine applies code or functions in the transition module 204 to the new structured data to generate one or more outcomes.

FIG. 3 depicts possible outcomes 305 to 310. The outcomes may cause the virtual machine to save data in a specific location in the TCU memory, discard data, transmit data via the TCU modem, or execute specific lines of scripting code. The Lua 5.3 Reference Manual, which is hereby incorporated by reference in its entirety, includes a more complete description of the kinds of scripting operations possible in Lua.

With reference to FIG. 1, the new structured data returns to the web service feature protocol buffer 102 as serialized data via the TCU protocol buffer 105, the TCU modem 104, and the service delivery network 103. In various embodiments, the TCU is configured to only transmit (or only serialize with the protocol buffer 102) the data over the service delivery network at the end of a drive cycle. In other words, the TCU is configured to locally store (a) the structured data or (b) the serialized structured data until the TCU detects an end of a drive cycle. The TCU may detect the end of the drive cycle with reference to one or more of a location of the vehicle key, the presence of a driver in the driver seat, the availability of a certain network (i.e., detection of a home wifi network), and a current state of the vehicle motor (e.g., active or inactive).

It should be appreciated that the web service feature protocol buffer 102 may supplement data received from the web service feature human interface 101 with instructions received from the other applications 108. The other applications 108 may be in communication with databases stored on the cloud 109. Similarly, the web service feature protocol buffer 102 may report data received from the vehicle 110 to both the web service feature human interface 101 and other applications 108 connected to the cloud 109.

Figure 4:
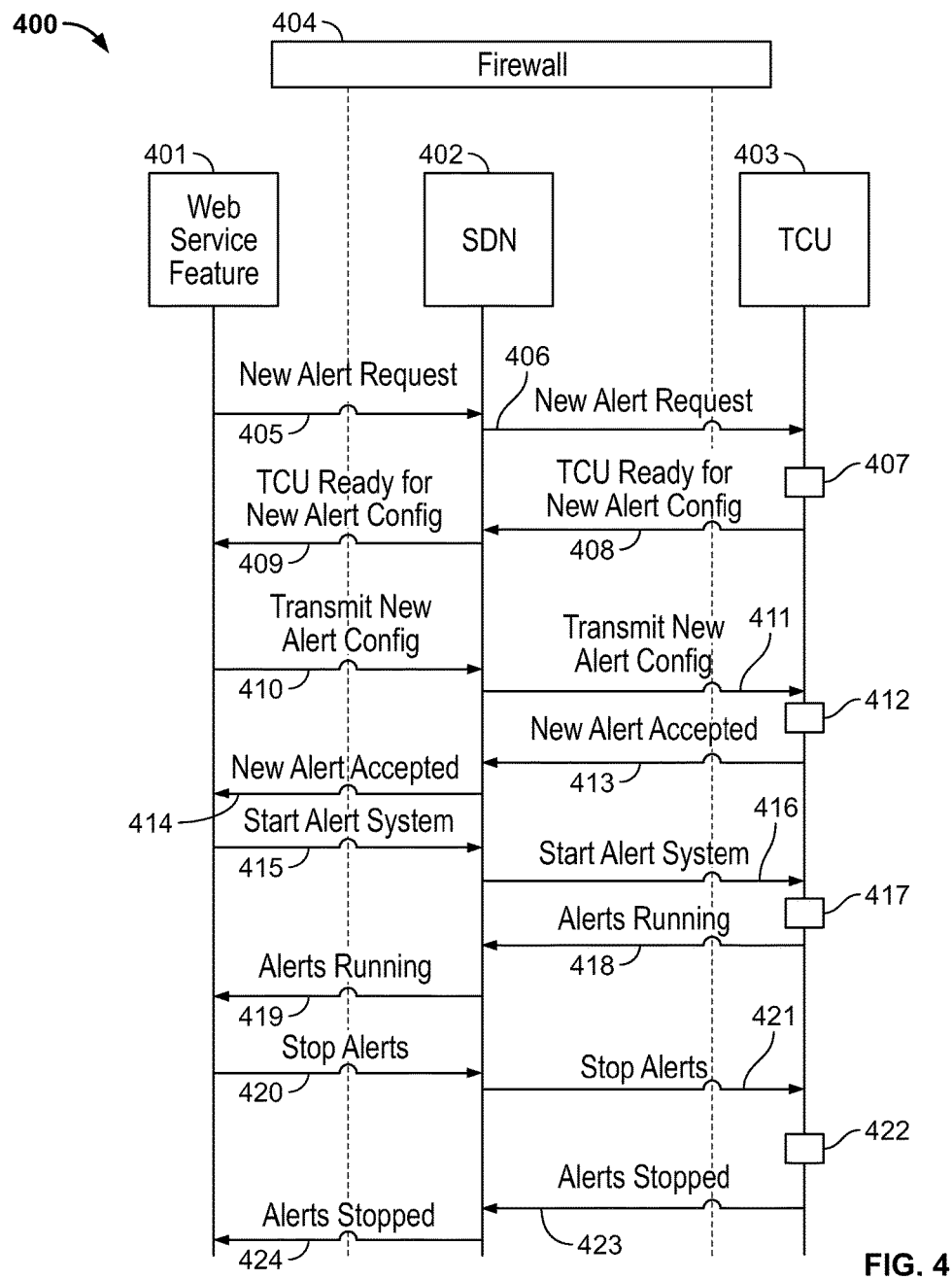
FIG. 4 is a block diagram of a method of transmitting scripting code to a vehicle.

Turning to FIG. 4, a method of installing a new virtual machine on a vehicle is generally shown and illustrated with block diagram 400. Web service feature 401 represents a program running on a remote computer. Service delivery network 402 is a wireless network configured to delivery data from the remote computer to a vehicle. Telematics control unit (TCU) 403 is loaded on a vehicle, such as the vehicle 110. A firewall 404 monitors and controls traffic flowing between the web service feature and the vehicle TCU 403.

In one example, the system operates as follows: The web service feature, in 405, prepares an alert instructing the TCU to expect a package defining a new virtual machine 200. The SDN forwards the alert to the TCU in 406. The TCU processes the alert and determines that it is ready to accept a new virtual machine in 407. The TCU sends the ready status in 408 through the TCU modem to the SDN. The SDN forwards the ready status to the web service feature in 409.

The web service feature responds with serialized data defining a new virtual machine in 410. The SDN forwards the data to the TCU in 411. In 412, the TCU de-serializes the data, resulting in structured data embodying the script. Immediately thereafter, the TCU loads the script into the memory and prepares to produce the virtual machine.

Thereafter, the TCU sends a confirmation through the SDN in 413. The SDN forwards the confirmation to the web service feature in 414. A person or software running on the web service feature instructs the TCU to execute the virtual machine in 415. The SDN forwards the instruction to the TCU in 416. The TCU executes the virtual machine in 417 and sends a confirmation to the web service feature in 418 and 419.

In 420 and 421, a person or software running on the web service feature instructs the TCU to terminate executing the virtual machine. In 422 the TCU terminates executing the virtual machine. In 423 and 424 the TCU confirms that the virtual machine is off.

It should be appreciated for the purposes of the claims, the term "TCU" is hereby defined to mean "telematics control unit comprising one or more antennas, one or more processors, and memory." It should further be appreciated that for the purposes of the claims, the term "loaded vehicle" is defined to mean "a vehicle comprising: a motor that drives one or more wheels, brakes for the wheels, a steering system configured to adjust the direction of at least one of the wheels, a source of stored energy configured to drive the motor, one or more processors, memory, and local vehicle sensors configured to report measurements to the processors."

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. A telematics control system comprising:
   an external server configured to serialize a script with an external protocol buffer and transmit the serialized script to a telematics control unit (TCU);
   a vehicle having sensors and the TCU, the TCU configured to:
     deserialize the script with a TCU protocol buffer;
     execute the script via an interpreter preloaded on the TCU;
     store data from the sensors based on the script;
     transmit the data to the TCU protocol buffer;
     build a virtual machine based on the script; and
     perform operations on the data with the virtual machine to produce a set of structured data,
     wherein the virtual machine is configured to:
       evaluate the set; and
       update itself by jumping to a line of code in the script, the location of the line being based on the evaluation.

2. The telematics control system of claim 1, wherein the TCU is configured to:
   serialize the stored sensor data with the TCU protocol buffer and transmit the serialized data over a content delivery network via an antenna.

3. The telematics control system of claim 2, wherein the external server is configured to receive the serialized sensor data and deserialize the serialized sensor data into structured data via the external protocol buffer.

4. The telematics control system of claim 1, wherein the interpreter, but not the script, is hard coded onto the TCU.

5. The telematics control system of claim 1, wherein the TCU detects the end of a drive cycle by monitoring a location of a key of the vehicle.

6. The telematics control system of claim 1, wherein the TCU detects the end of a drive cycle by monitoring a presence of a driver at a driver seat of the vehicle.

7. The telematics control system of claim 1, wherein the TCU detects the end of a drive cycle by detecting a home Wi-Fi network corresponding to a driver of the vehicle.

8. The telematics control system of claim 1, wherein the TCU detects the end of a drive cycle by monitoring a state of a motor of the vehicle.

9. A method of controlling a telematics control unit (TCU) in a vehicle, comprising:
   serializing a script with an external server protocol buffer;
   transmitting the serialized script to the TCU;
   deserializing the script with a TCU protocol buffer;
   executing the script via an interpreter preloaded on the TCU;
   storing data from vehicle sensors based on the script;
   transmitting the data to the TCU protocol buffer;
   building a virtual machine based on the script;
   performing operations on the data with the virtual machine to produce a set of structured data;
   evaluating, via the virtual machine, the set; and
   updating the virtual machine by jumping to a line of code in the script, the location of the line being based on the evaluation.

10. The method of claim 9, further comprising:
executing the script via the interpreter pre-loaded on the TCU to transmit the data to the TCU protocol buffer.

11. The method of claim 9, further comprising:
serializing the stored sensor data with the TCU protocol buffer;
transmitting the serialized sensor data via an antenna of the TCU;
receiving the serialized sensor data at the external protocol buffer; and
deserializing the serialized sensor data into structured data with the external protocol buffer.

12. The method of claim 9, further including:
transmitting an alert to the TCU;
determining, upon receipt of the alert, whether the TCU is ready to accept a virtual machine;
sending a ready status via the TCU upon determining that the TCU is ready to accept the virtual machine; and
transmitting the serialized script to the TCU upon receiving the ready status.

13. A vehicle comprising:
sensors; and
a telematics control unit (TCU) to:
    deserialize a script received from an external server with a TCU protocol buffer, wherein the script is serialized by the external server with an external protocol buffer;
    execute the script via an interpreter preloaded on the TCU;
    store data from the sensors based on the script;
    transmit the data to the TCU protocol buffer;
    build a virtual machine based on the script; and
    perform operations on the data with the virtual machine to produce a set of structured data,
wherein the virtual machine is to:
evaluate the set; and
update itself by jumping to a line of code in the script, the location of the line being based on the evaluation.

\* \* \* \* \*